US008478255B2

(12) United States Patent
Ikemori et al.

(10) Patent No.: US 8,478,255 B2
(45) Date of Patent: Jul. 2, 2013

(54) PORTABLE TERMINAL DEVICE, ADDRESS BOOK TRANSFER DEVICE, INFORMATION DISPLAY METHOD AND ADDRESS BOOK TRANSFER METHOD USED IN PORTABLE TERMINAL DEVICE, AND COMPUTER PROGRAM

(75) Inventors: Takashi Ikemori, Osaka (JP); Yasushi Yamane, Osaka (JP); Katsuyuki Miyazaki, Osaka (JP)

(73) Assignee: Fujitsu Limited, Kawasaki (JP)

( * ) Notice: Subject to any disclaimer, the term of this patent is extended or adjusted under 35 U.S.C. 154(b) by 879 days.

(21) Appl. No.: 12/216,804

(22) Filed: Jul. 10, 2008

(65) Prior Publication Data
US 2009/0054044 A1    Feb. 26, 2009

Related U.S. Application Data

(63) Continuation of application No. PCT/JP2006/300153, filed on Jan. 10, 2006.

(51) Int. Cl.
*H04M 3/42* (2006.01)
*H04M 1/00* (2006.01)

(52) U.S. Cl.
USPC ................ 455/414.2; 455/566; 709/204

(58) Field of Classification Search
USPC .. 455/410–414.4, 456.1–456.6; 380/247–250
See application file for complete search history.

(56) References Cited

U.S. PATENT DOCUMENTS

| 7,199,730 | B2 * | 4/2007 | Matsuda ................ 341/55 |
| 2001/0041593 | A1 | 11/2001 | Asada |
| 2003/0097597 | A1 * | 5/2003 | Lewis ................ 713/202 |
| 2005/0097171 | A1 * | 5/2005 | Hikichi ................ 709/204 |
| 2005/0149487 | A1 * | 7/2005 | Celik ................ 707/1 |
| 2005/0235291 | A1 | 10/2005 | Kamiya et al. |
| 2006/0025110 | A1 * | 2/2006 | Liu ................ 455/411 |

(Continued)

FOREIGN PATENT DOCUMENTS

| JP | 2-149451 | 12/1990 |
| JP | 10-293728 | 11/1998 |

(Continued)

OTHER PUBLICATIONS

International Search Report mailed Feb. 7, 2006 in connection with the International application No. PCT/JP2006/300153.

(Continued)

*Primary Examiner* — Kashif Siddiqui
(74) *Attorney, Agent, or Firm* — Staas & Halsey LLP

(57) ABSTRACT

A mobile phone terminal (1) is provided with an address book table (TLA) storing an address book indicating names and telephone numbers or electronic mail addresses of other parties of communication, a concealed address book table (TLB) generating a concealed character string in which a part or a whole of characters of the names and the telephone numbers or the electronic mail addresses of the other parties of communication is concealed and storing a plurality of the generated concealed character strings, and an address book display process portion (104) displaying, in a real name display mode, a name and a telephone number or an electronic mail address of other party of communication designated by a user based on the address book table (TLA) without concealing characters of the same, and displaying, in an anonymous display mode, the same as the concealed character string in which a part or a whole of the characters is concealed based on the concealed address book table (TLB).

14 Claims, 21 Drawing Sheets

U.S. PATENT DOCUMENTS

| | | | |
|---|---|---|---|
| 2006/0106803 A1* | 5/2006 | Takeuchi et al. | 707/9 |
| 2006/0111125 A1* | 5/2006 | Karaoguz | 455/456.2 |
| 2007/0016781 A1* | 1/2007 | Asokan et al. | 713/173 |

FOREIGN PATENT DOCUMENTS

| | | |
|---|---|---|
| JP | 2000-47944 | 2/2000 |
| JP | 2001-5787 | 1/2001 |
| JP | 2001-320768 | 11/2001 |
| JP | 2001-352579 | 12/2001 |
| JP | 2003-332978 | 11/2003 |
| JP | 2003-337535 | 11/2003 |
| JP | 2004-289491 | 10/2004 |

OTHER PUBLICATIONS

International Preliminary Report on Patentability, mailed Jul. 24, 2008 and issued in corresponding International Patent Application No. PCT/JP2006/300153.

Japanese Office Action dated Sep. 21, 2010 for corresponding Japanese patent application No. 2007-553790.

Chinese Office Action issued Apr. 25, 2011 in corresponding Chinese Patent Application 200680034639.5.

* cited by examiner

FIG. 6

TLA

| IDENTIFICATION CODE | NAME | TELEPHONE NUMBER | E-MAIL ADDRESS |
|---|---|---|---|
| 0001 | TAKAHASHI YUJI | 010-1234-5678 | y-t@a.ne.jp |
| 0002 | TAKAGI YUZO | 010-0000-2222 | yuzo@b.ne.jp |
| 0003 | TAKADA KENJI | 010-1111-1111 | k-takada@c.ne.jp |
| 0004 | TAKANO YUJI | 010-9999-0000 | yuji-t@a.ne.jp |
| 0005 | SATO KENICHI | 010-9876-5432 | i.sato@c.ne.jp |
| 0006 | OHNO TARO | 010-8888-8888 | taro@n.ne.jp |
| 0007 | TAKADA JIRO | 06-1234-5678 | j-takada@b.ne.jp |
| 0008 | KONISHI HANAKO | 010-7777-7777 | hanako@d.ne.jp |
| 0009 | (CORPORATION) ANSHIN SEIYAKU | 03-1000-9000 | anshin@x.co.jp |
| 0010 | ANZEN KOJI Inc. | 078-111-1111 | anzen@y.co.jp |

FIG. 7

TLB

| IDENTIFICATION CODE | NAME | TELEPHONE NUMBER | E-MAIL ADDRESS |
|---|---|---|---|
| 0001 | TAKAH**** **** | 010-1234-**** | ***@a.ne.jp |
| 0002 | TAKAG* **** | 010-0000-**** | ****@b.ne.jp |
| 0003 | TAKADA K**** | 010-1111-**** | ********@c.ne.jp |
| 0004 | TAKAN* **** | 010-9999-**** | ******@a.ne.jp |
| 0005 | S*** ******** | 010-9876-**** | *******@c.ne.jp |
| 0006 | O**** **** | 010-8888-**** | ****@n.ne.jp |
| 0007 | TAKADA J*** | 06-1234-**** | *********@b.ne.jp |
| 0008 | K******* ******* | 010-7777-**** | ******@d.ne.jp |
| 0009 | (CORPORATION) ANS*** ******* | 03-1000-**** | *******@x.co.jp |
| 0010 | ANZ** **** Inc. | 078-111-**** | ******@y.co.jp |

| FREQUENTLY APPEARING CHARACTER AND CHARACTER STRING |
|---|
| CORPORATION |
| Inc. |
| Co., Ltd |
| Ltd |
| COMPANY LIMITED |
| Corp. |
| BANK |
| ⋮ |

| CHARACTER | POSITION |
|---|---|
| KO | LAST CHARACTER OF NAME |
| MI | LAST CHARACTER OF NAME |
| KA | LAST CHARACTER OF NAME |
| O | LAST CHARACTER OF NAME |

TLA

| IDENTIFICATION CODE | NAME | TELEPHONE NUMBER | E-MAIL ADDRESS |
|---|---|---|---|
| 0001 | YUJI TAKAHASHI | 010-1234-5678 | y-t@a.ne.jp |
| 0002 | YUZO TAKAGI | 010-0000-2222 | yuzo@b.ne.jp |
| 0003 | KENJI TAKADA | 010-1111-1111 | k-takada@c.ne.jp |
| 0004 | YUJI TAKANO | 010-9999-0000 | yuji-t@a.ne.jp |
| 0005 | KENICHI SATO | 010-9876-5432 | i.sato@c.ne.jp |
| 0006 | TARO OHNO | 010-8888-8888 | taro@n.ne.jp |
| 0007 | JIRO TAKADA | 06-1234-5678 | j-takada@b.ne.jp |
| 0008 | HANAKO KONISHI | 010-7777-7777 | hanako@d.ne.jp |
| 0009 | ANSHIN PHARMACEUTICAL Co.,Ltd | 03-1000-9000 | anshin@x.co.jp |
| 0010 | ANZEN CONSTRUCTION Co.,Ltd | 078-111-1111 | anzen@y.co.jp |

FIG. 19

TLB

| IDENTIFICATION CODE | NAME | TELEPHONE NUMBER | E-MAIL ADDRESS |
|---|---|---|---|
| 0001 | Y*** TAKAHASHI | 010-1234-**** | ***@a.ne.jp |
| 0002 | Y*** TAKAGI | 010-0000-**** | ****@b.ne.jp |
| 0003 | K**** TAKADA | 010-1111-**** | ********@c.ne.jp |
| 0004 | Y*** TAKANO | 010-9999-**** | *******@a.ne.jp |
| 0005 | K***** SATO | 010-9876-**** | *******@c.ne.jp |
| 0006 | T*** OHNO | 010-8888-**** | ****@n.ne.jp |
| 0007 | J*** TAKADA | 06-1234-**** | ********@b.ne.jp |
| 0008 | H***** KONISHI | 010-7777-**** | ******@d.ne.jp |
| 0009 | ANS*** ************ Co.,Ltd | 03-1000-**** | *******@x.co.jp |
| 0010 | ANZ** ************ Co.,Ltd | 078-111-**** | ******@y.co.jp |

| A | KA | SA | TA | NA |

0002 TAKAG* ****

0003 TAKADA K****

0004 TAKAN* ****

[BEFORE] [NEXT] [RETURN]

HG3

(b)

| A | KA | SA | TA | NA |

0002 TAKAGI YUZO

0003 TAKADA KENJI

0004 TAKANO YUJI

[BEFORE] [NEXT] [RETURN]

HG4

PORTABLE TERMINAL DEVICE, ADDRESS BOOK TRANSFER DEVICE, INFORMATION DISPLAY METHOD AND ADDRESS BOOK TRANSFER METHOD USED IN PORTABLE TERMINAL DEVICE, AND COMPUTER PROGRAM

CROSS REFERENCE TO RELATED APPLICATIONS

This is a continuing application, filed under 35 U.S.C. §111(a), of International Application PCT/JP2006/300153, filed Jan. 10, 2006, the contents of which are incorporated herein by reference.

TECHNICAL FIELD

The present invention relates to a portable terminal device and information display method and the like used in the portable terminal device.

BACKGROUND OF THE INVENTION

1. Field of the Invention

Many telephone numbers and electronic mail addresses have recently been able to be stored in an address book of a mobile phone terminal as the capacity of a storage medium such as a flash memory has increased. In addition, information other than the telephone number and the electronic mail address can be stored, too. For example, addresses or dates of birth can be stored as items of memo. Other than that, some mobile phone terminals can store facial portraits.

As quantity of data that can be stored in an address book of a mobile phone terminal has increased, a risk when the mobile phone terminal is lost or stolen has also increased. If such an accident occurs, personal information in the address book may be stolen or abused by a third party.

In addition, since the protection of personal information has become a big concern for public, a public office or a company who lends mobile phone terminals to employees is also required to take countermeasures against leakage of information.

Therefore, a service as described in Non-Patent Document 1 is proposed, When a user has lost his or her mobile phone terminal or it has been stolen, the user gets in touch with a center by using his or her personal computer at home or the like to inform the center about that. Then, the center sends instructions to erase data to the mobile phone terminal. When the mobile phone terminal receives the instructions, it activates an application so as to erase data.

Patent document 1: JP-A-2003-332978

Non-Patent Document 1: "Erase stored data remotely for protecting leakage of information when your mobile phone is lost", Nikkei Business Publications, Inc., Web site, Apr. 14, 2005, URL: http://itpro.nikkeibp.co.jp/free/TIS/keitai/20050412/158911/, searched on Jan. 4, 2006

However, if a mobile phone terminal is out of the service area or if the power of the mobile phone terminal is turned off, the mobile phone terminal cannot receive the instructions from the center. Therefore, even if the method described in Non-Patent Document 1 is used, data stored in the address book cannot be erased.

In addition, a method described in Patent Document 1 is proposed. Although this method can improve security in transmitting and receiving data between communication devices, it cannot prevent data stored in a mobile phone terminal from being stolen.

It is an object of the present invention to manage the address book that is used in a mobile phone terminal or the like more safely than the conventional method.

2. Disclosure of the Invention

A portable terminal device according to one aspect of the present invention includes an address book storing portion that stores an address book indicating names and telephone numbers or electronic mail addresses of other parties of communication, a concealed character string generating portion that generates a concealed character string in which a part or a whole of characters of the names and the telephone numbers or the electronic mail addresses of the other parties of communication is concealed, and a display portion that displays, in a first display mode, a name and a telephone number or an electronic mail address of other party of communication designated by a user based on the address book without concealing characters of the name and the telephone number or the electronic mail address of the other party of communication designated by the user, and that displays, in a second display mode, the name and the telephone number or the electronic mail address of the other party of communication designated by the user as the concealed character string.

An address book transfer device according to another aspect of the present invention is an address book transfer device for transferring an address book stored in a first portable terminal device to a second portable terminal device, the address book transfer device. The address book transfer device includes an address book input portion that enters the address book from the first portable terminal device, a concealed address book generating portion that generates a concealed address book by concealing a part of characters indicated in the entered address book, and an address book output portion that delivers the generated concealed address book and an address book from which the concealed address book is generated to the second portable terminal device.

According to the present invention, an address book that is used in a mobile phone terminal or the like can be managed more safely than the conventional method.

BRIEF DESCRIPTION OF THE DRAWINGS

FIG. 6 is a diagram showing an example of an address book table.

FIG. 7 is a diagram showing an example of a concealed address book table.

FIG. 9 is a diagram showing an example of frequently appearing character data such as a company name.

FIG. 11 is a diagram showing an example of personal name frequently appearing character data.

FIG. 18 is a diagram showing an example of the address book table written in English.

FIG. 19 is a diagram showing an example of the concealed address book table written in English.

FIGS. 21A and 21B are diagrams showing examples of list screens.

BEST MODE FOR CARRYING OUT THE INVENTION

Figure 1:
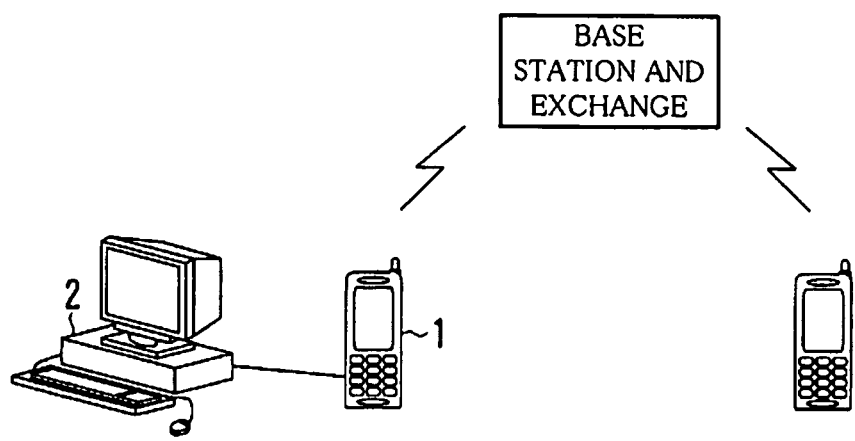
FIG. 1 is a diagram showing an example of a structure of the entire system including mobile phone terminals and an anonymous address book transfer device.
Figure 2:
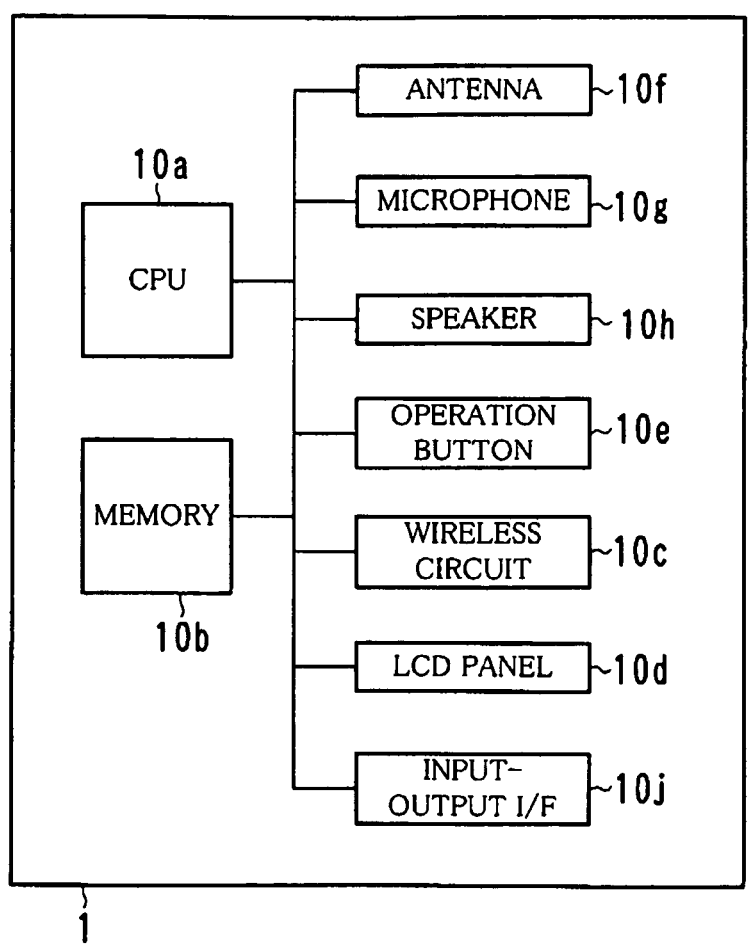
FIG. 2 is a diagram showing an example of a hardware structure of the mobile phone terminal.
Figure 3:
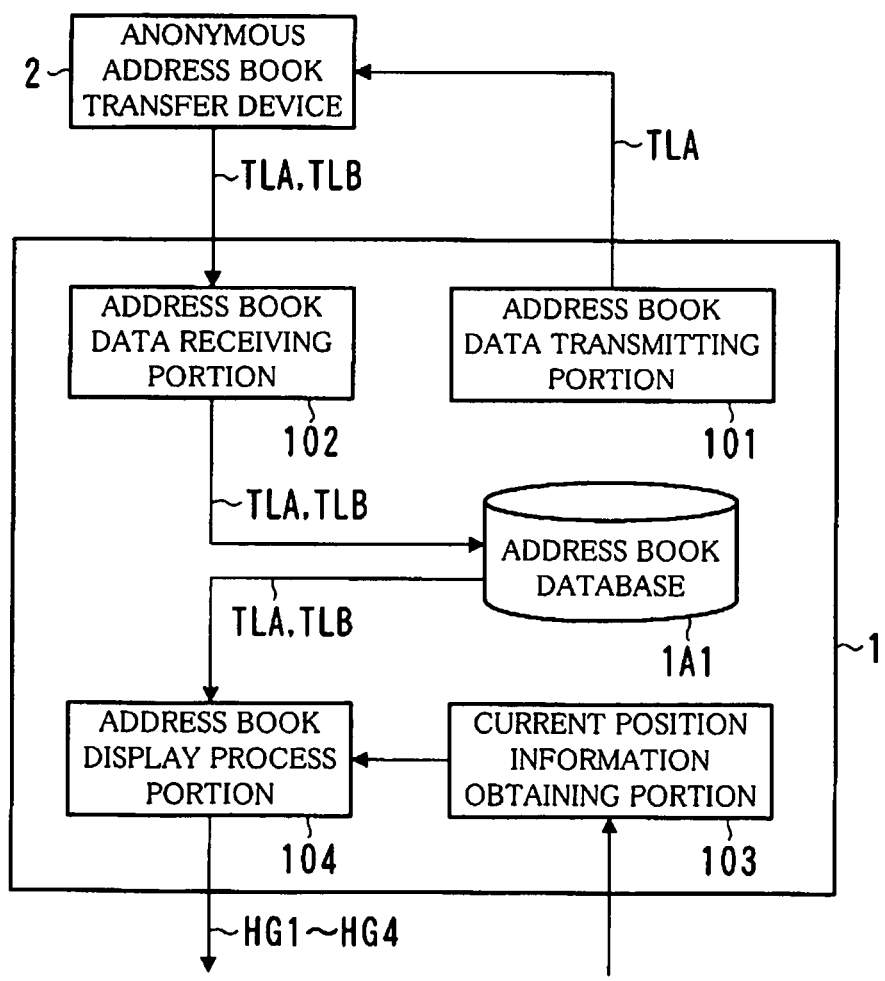
FIG. 3 is a diagram showing an example of a functional structure of the mobile phone terminal.
Figure 4:
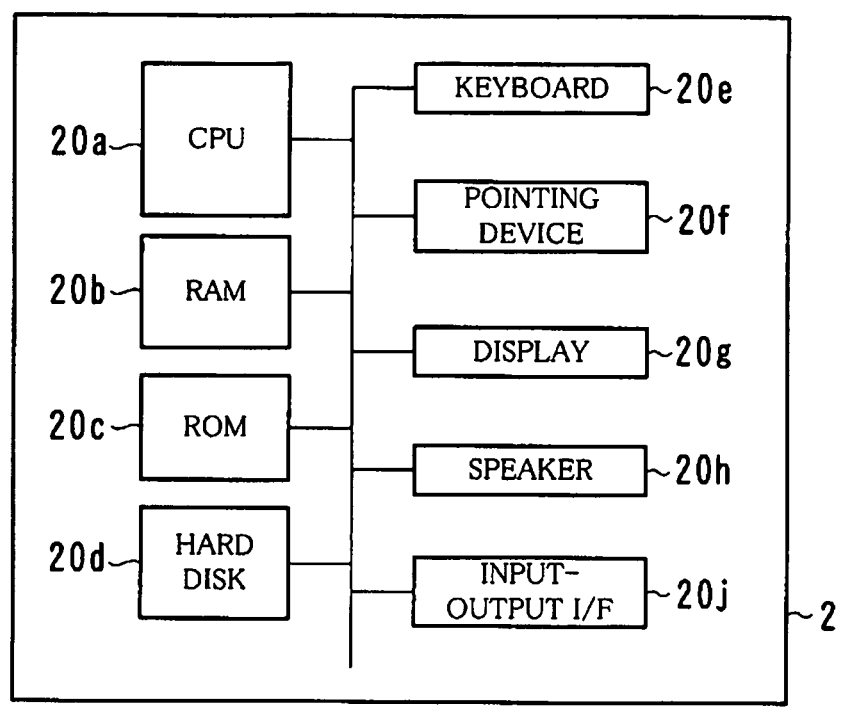
FIG. 4 is a diagram showing an example of a hardware structure of the anonymous address book transfer device.
Figure 5:
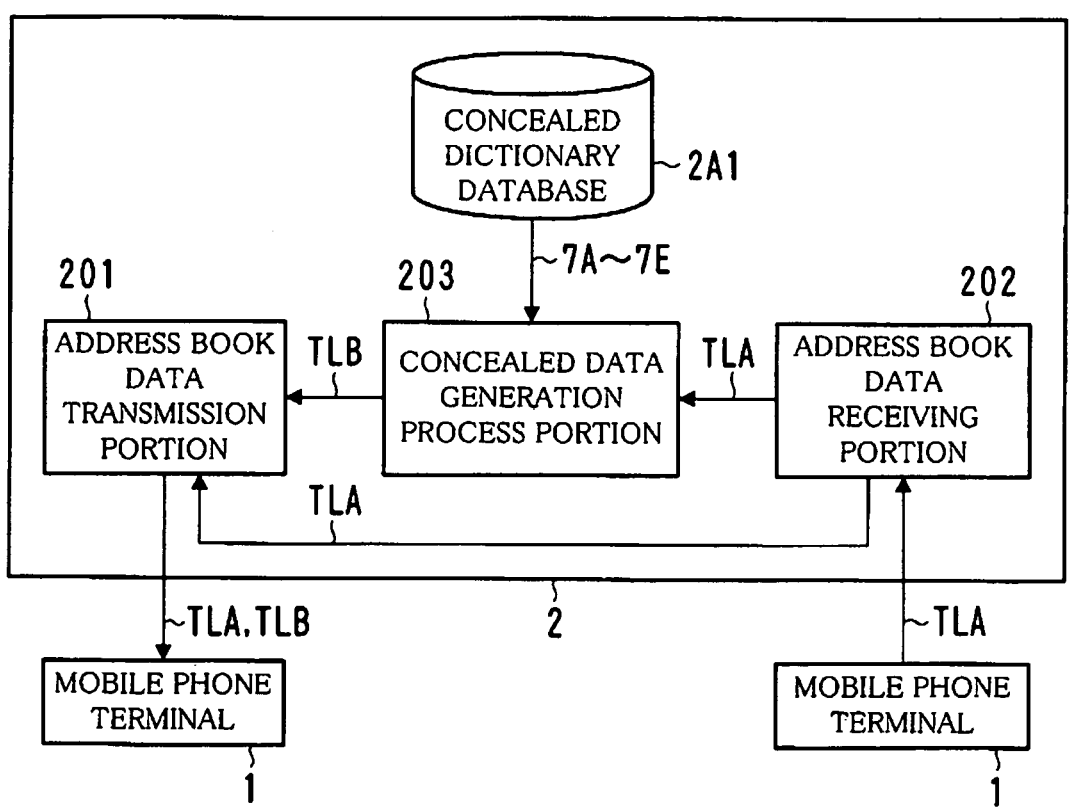
FIG. 5 is a diagram showing an example of a functional structure of the anonymous address book transfer device.

FIG. 1 is a diagram showing an example of a structure of the entire system including mobile phone terminals 1 and an anonymous address book transfer device 2, FIG. 2 is a diagram showing an example of a hardware structure of the mobile phone terminal 1, FIG. 3 is a diagram showing an example of a functional structure of the mobile phone terminal 1, FIG. 4 is a diagram showing an example of a hardware structure of the anonymous address book transfer device 2, and FIG. 5 is a diagram showing an example of a functional structure of the anonymous address book transfer device 2.

As shown in FIG. 1, the mobile phone terminal 1 according to the present invention can communicate with other mobile phone terminals or fixed telephones via base stations and switching centers. In addition, it can send and receive electronic mail with other mobile phone terminals or personal computers via the Internet and the like. In addition, it can be connected to the anonymous address book transfer device 2 via an input-output interface such as Universal Serial Bus (USB) or the IEEE1394 for sending and receiving data.

As shown in FIG. 2, the mobile phone terminal 1 includes a CPU 10a, a memory 10b, a wireless circuit 10c, a liquid crystal panel 10d, an operation button 10e, an antenna 10f, a microphone 10g, a speaker 10h and an input-output interface 10j. In this way, the hardware structure of the mobile phone terminal 1 is basically the same as a hardware structure of a conventional mobile phone terminal.

The memory 10b stores programs and data for realizing an address book data transmitting portion 101, an address book data receiving portion 102, a current position information obtaining portion 103, an address book display process portion 104, an address book database 1A1 and the like as shown in FIG. 3. These programs are executed by the CPU 10a.

The anonymous address book transfer device 2 includes a CPU 20a, a RAM 20b, a ROM 20c, a hard disk 20d, a keyboard 20e, a pointing device 20f, a display 20g, a speaker 20h and an input-output interface 20j as shown in FIG. 4. The hard disk 20d stores programs and data that are installed for realizing an address book data transmission portion 201, an address book data receiving portion 202, a concealed data generation process portion 203, a concealed dictionary database 2A1 and the like as shown in FIG. 5. These programs and data are loaded to the RAM 20b in accordance with necessity, and the CPU 20a executes the programs. A personal computer, a workstation or the like can be used as the anonymous address book transfer device 2.

The anonymous address book transfer device 2 is installed in a mobile phone service shop or the like, for example, and it is used for transferring an address book stored in an old mobile phone terminal to a new mobile phone terminal for a customer who buys the new mobile phone terminal. In addition, software for realizing the functions shown in FIG. 5 may be packaged and provided to users of the mobile phone terminals.

Figure 8:
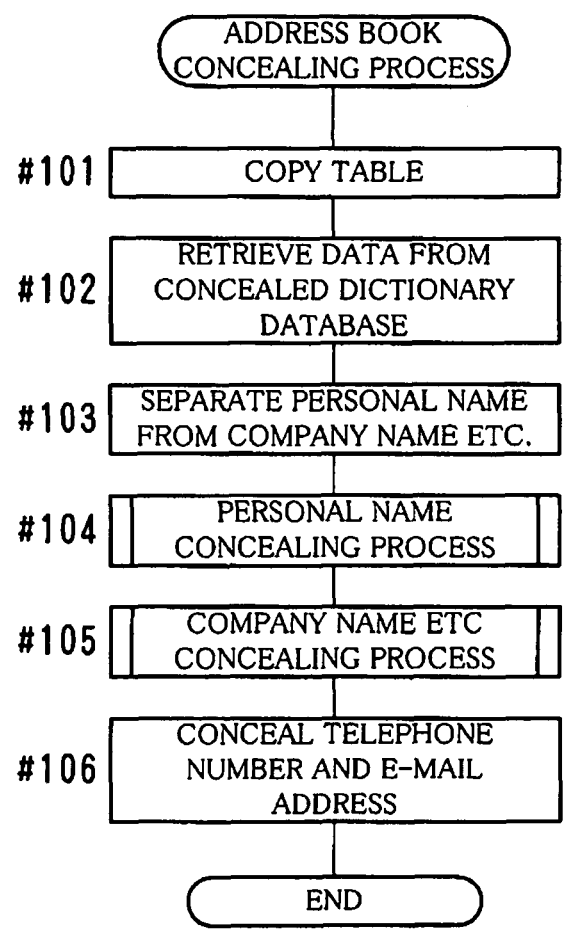
FIG. 8 is a flowchart for explaining an example of a flow of an address book concealing process.
Figure 10:
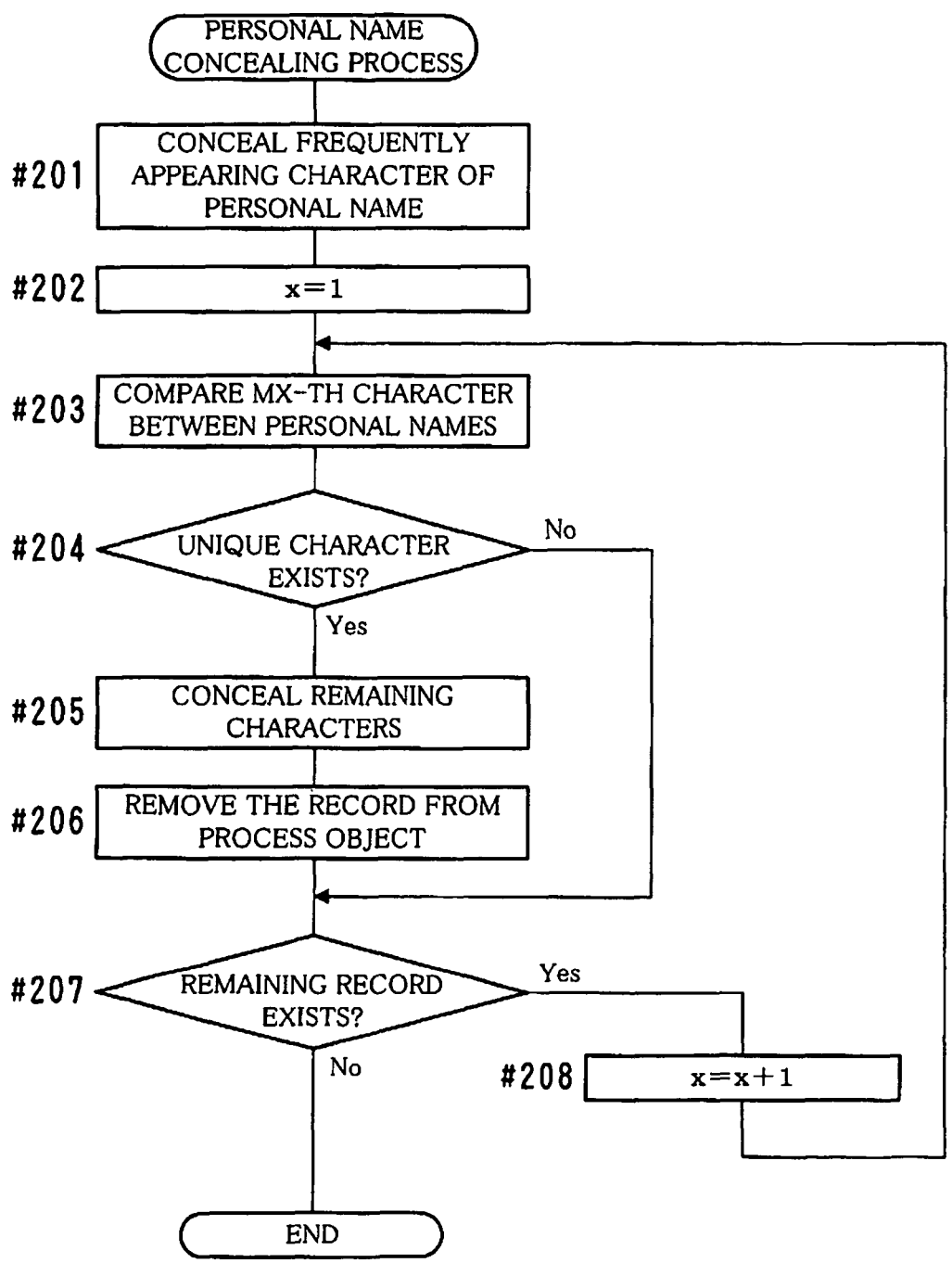
FIG. 10 is a flowchart for explaining an example of a flow of a personal name concealing process.
Figure 12:
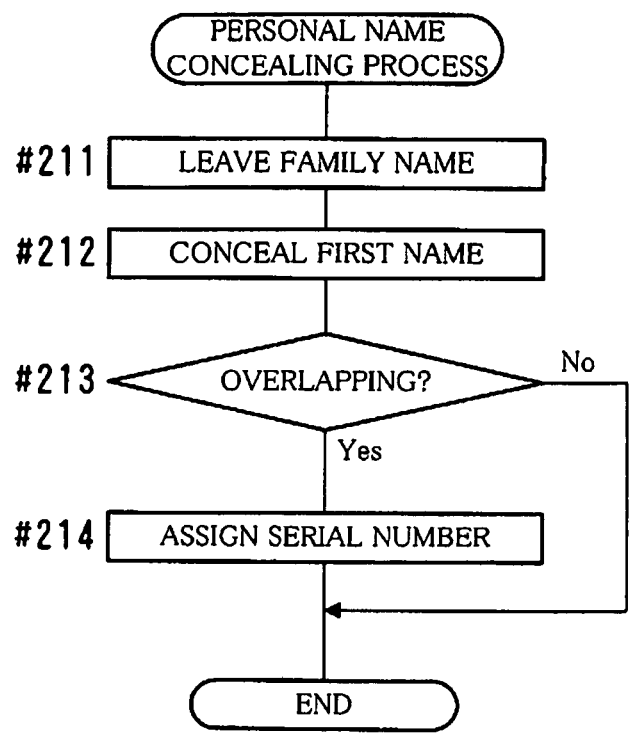
FIG. 12 is a flowchart for explaining a variation of the flow of the personal name concealing process.
Figure 13:
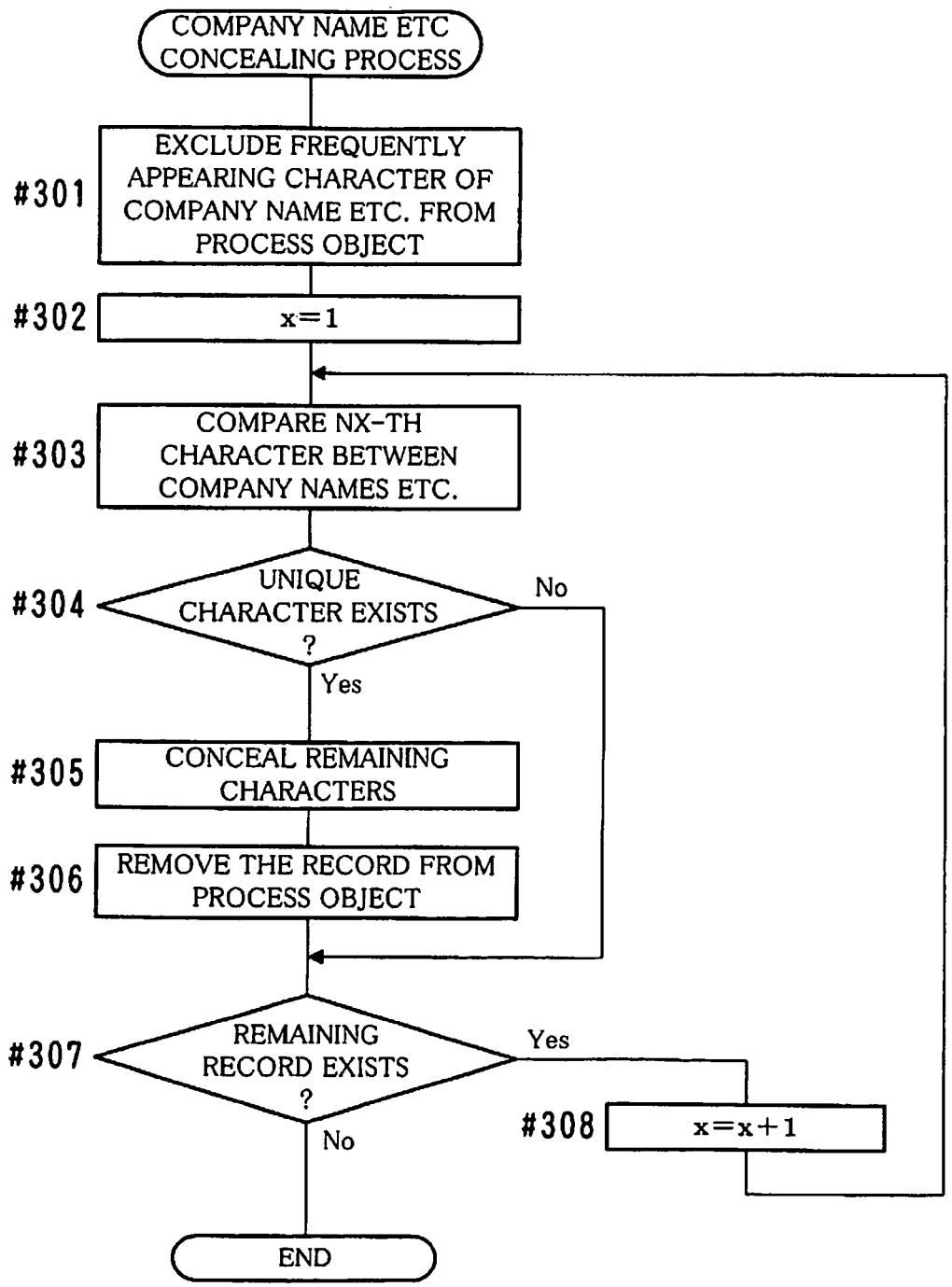
FIG. 13 is a flowchart for explaining an example of a flow of a company name etc concealing process.
Figure 14:
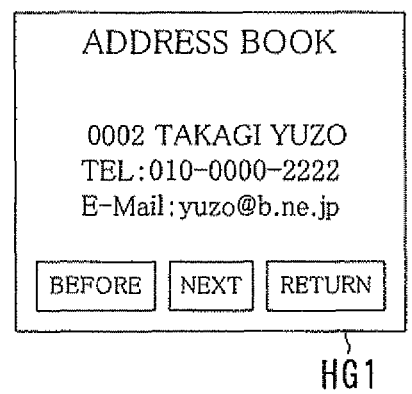
FIGS. 14A and 14B are diagrams showing examples of an address book screen and an anonymous address book screen.
Figure 14:
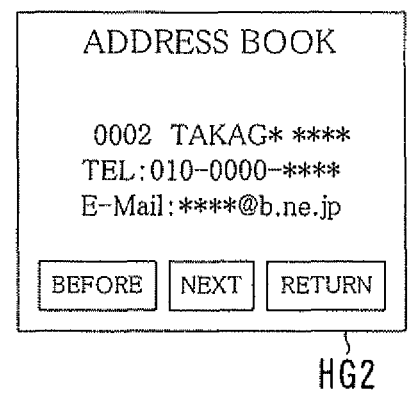
Figure 15:
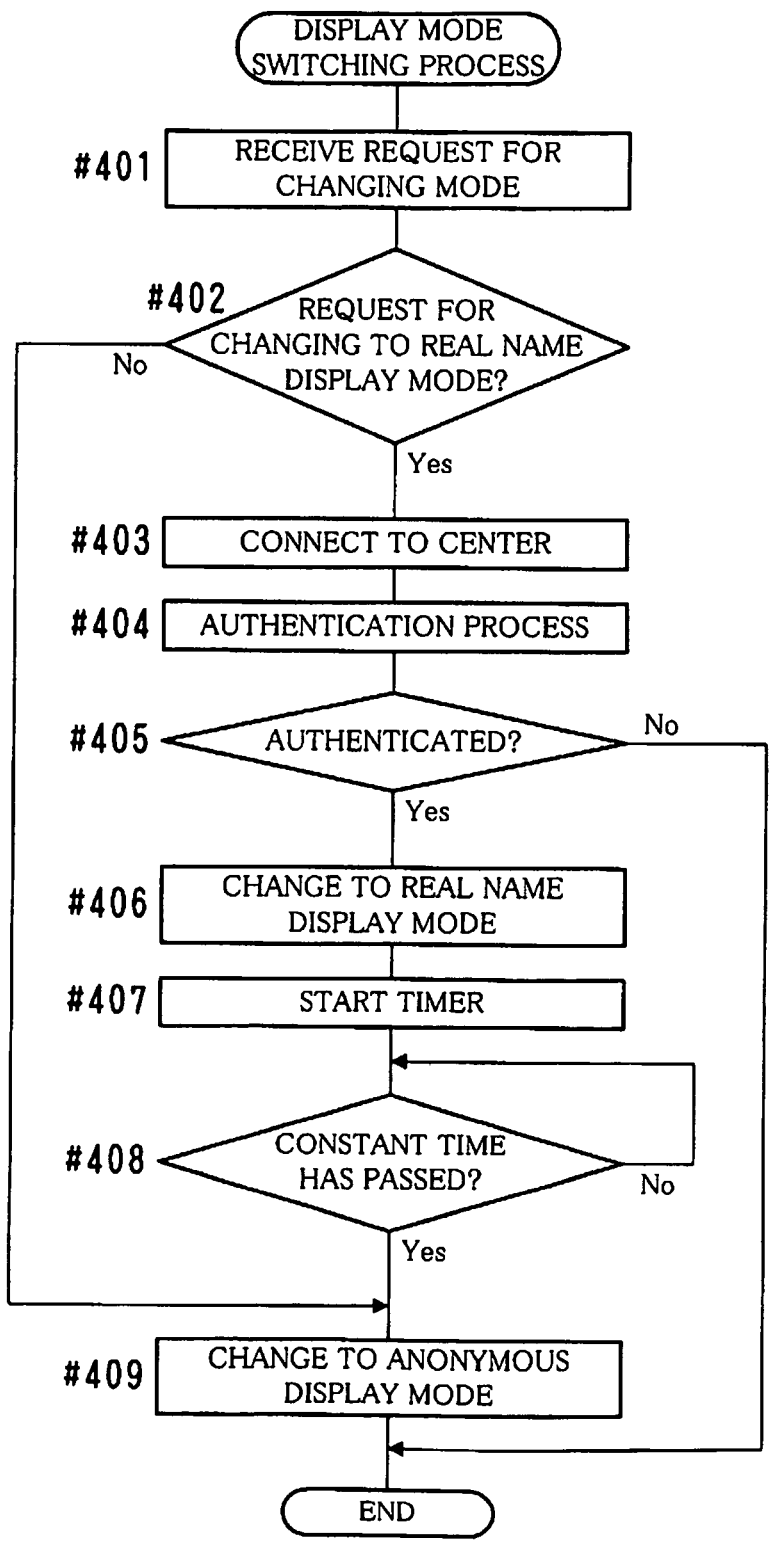
FIG. 15 is a flowchart for explaining an example of a flow of a display mode switching process.
Figure 16:
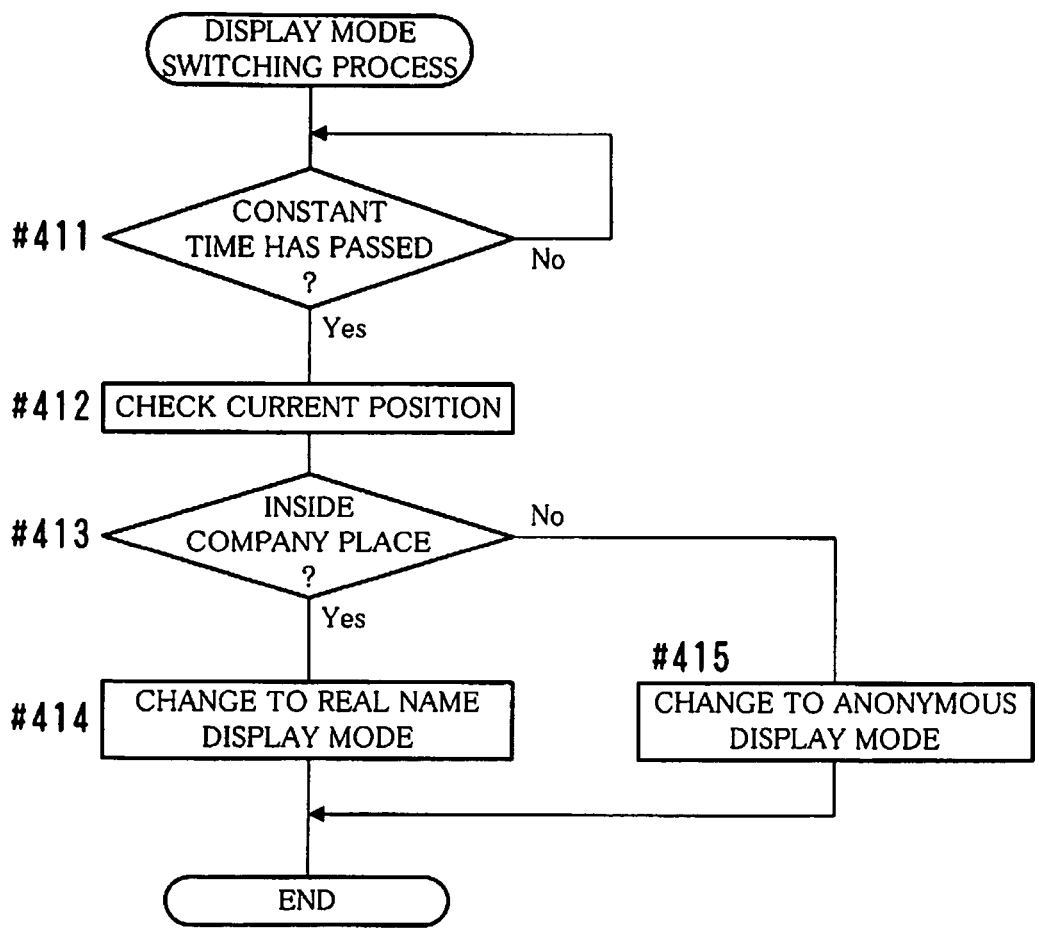
FIG. 16 is a flowchart for explaining a variation of the flow of the display mode switching process.

FIG. 6 is a diagram showing an example of an address book table TLA, FIG. 7 is a diagram showing an example of a concealed address book table TLB, FIG. 8 is a flowchart for explaining an example of a flow of an address book concealing process, FIG. 9 is a diagram showing an example of frequently appearing character data 7A such as a company name, FIG. 10 is a flowchart for explaining an example of a flow of a personal name concealing process, FIG. 11 is a diagram showing an example of personal name frequently appearing character data 7B, FIG. 12 is a flowchart for explaining a variation of the flow of the personal name concealing process, FIG. 13 is a flowchart for explaining an example of a flow of a company name etc concealing process, FIGS. 14A and 14B are diagrams showing examples of an address book screen HG1 and an anonymous address book screen HG2, FIG. 15 is a flowchart for explaining an example of a flow of a display mode switching process, and FIG. 16 is a flowchart for explaining a variation of the flow of the display mode switching process.

Next, process contents and the like of the individual portions of the mobile phone terminal 1 shown in FIG. 3 and the individual portions of the anonymous address book transfer device 2 shown in FIG. 5 will be described in detail.

In FIG. 3, the address book database 1A1 manages the address book table TLA and the concealed address book table TLB. As shown in FIG. 6, the address book table TLA stores data on names of other parties of communication such as the family relatives, acquaintances or customers of the user of the mobile phone terminal 1 (personal names, company names or store names), telephone numbers and electronic mail addresses of the same, i.e., address book data. This address book table TLA itself is basically the same as an address book or a telephone book that is provided in a conventional mobile phone terminal. Note that one record is usually assigned to each of the other parties of communication. In addition, a unique identification code is assigned to each of the records so that the record can be distinguished from the other records. This identification code may be called a "memory number" in general.

On the other hand, the concealed address book table TLB stores data in which some parts of names, telephone numbers and electronic mail addresses are concealed by using a predetermined sign as shown in FIG. 7. As can be understood from the comparison between the address book table TLA and the concealed address book table TLB, data of each record in the concealed address book table TLB is obtained by replacing a part of record data having the same identification code as that of the record data stored in the address book table TLA with a predetermined sign so as to conceal (hide) the same. In this example, "*" (asterisk) is used as the predetermined sign.

The address book data transmitting portion 101 performs a process of transmitting data of the address book table TLA stored in the address book database 1A1 to the anonymous address book transfer device 2 via the input-output interface 10j. The address book data receiving portion 102 performs a process of receiving the data of the address book table TLA or the data of the concealed address book table TLB from the anonymous address book transfer device 2 via the input-output interface 105.

In FIG. 5, the address book data transmission portion 201 performs a process of transmitting the data of the address book table TLA or the data of the concealed address book table TLB to the mobile phone terminal 1 via the input-output interface 20j. The address book data receiving portion 202 performs a process of receiving the data of the address book table TLA from the mobile phone terminal 1 via the input-output interface 203.

The user of the mobile phone terminal 1 can perform an input process of a new record to the address book table TLA, an editing process of a record stored in the address book table TLA and a deleting process of a record or the like by the same operation as that of the conventional mobile phone terminal. The address book database 1A1 performs the above-mentioned process in response to the operation of the user in the same manner as that of the conventional mobile phone terminal.

In addition, when the user buys a new mobile phone terminal 1 (as a model change), he or she can transfer the address book table TLA that was used in the old mobile phone terminal 1 to the new mobile phone terminal 1 via the anonymous address book transfer device 2. This function itself is the same as that provided in the conventional mobile phone terminal. In addition, according to the mobile phone terminal 1 and the anonymous address book transfer device 2 of the present embodiment, the user can also generate the concealed address book table TLB when the address book table TLA is transferred via the anonymous address book transfer device 2. This function will be described later.

The concealed dictionary database 2A1 stores various data indicating a rule or the like for concealing information of the address book partially. The various data are used when the concealed address book table TLB is generated.

The concealed data generation process portion 203 generates the concealed address book table TLB by concealing partially data of each record of the address book table TLA received by the address book data receiving portion 202. The concealed address book table TLB is generated by the procedure shown in FIG. 8, for example.

When the address book table TLA is received, the concealed data generation process portion 203 generates a copy of the address book table TLA (#101 in FIG. 8) and retrieves the company name etc frequently appearing character data 7A, the personal name frequently appearing character data 7B, personal name concealing rule data 7C, company name etc concealing rule data 7D, telephone number etc concealing rule data 7E and the like from the concealed dictionary database 2A1 (#102).

The records included in the copy of the address book table TLA are classified into records of persons and records of companies, stores or the like based on the company name etc frequently appearing character data 7A (#103). The company name et frequently appearing character data 7A indicates characters or character strings included generally in names of companies, stores or the like. For example, if the address book written in Japanese is handled, the company name etc frequently appearing character data 7A indicating characters or character strings is prepared in advance. If the address book written in English is handled, the company name etc frequently appearing character data 7A indicating characters or character strings as shown in FIG. 9 is prepared in advance. Other than that, the company name etc frequently appearing character data 7A supporting various languages in accordance with necessity is prepared in advance.

More specifically, in the steps #102 and #103, the concealed data generation process portion 203 retrieves the company name etc frequently appearing character data 7A supporting the language of the information described in the address book table TLA and decides that a record whose name includes the character or the character string included in the company name etc frequently appearing character data 7A is a record indicating a company, a store or the like while it decides that records other than that indicate persons. In this way, the records included in the copy of the address book table TLA are classified.

A process for concealing partially the name of the record (the character string) related to a person among the records in the copy of the address book table TLA is performed in accordance with the personal name concealing rule data 7C (#104). The personal name concealing rule data 7C indicates a rule for realizing the process as shown in FIG. 10 for example. In other words, the concealed data generation process portion 203 performs the process of concealing partially the name of the person in accordance with the personal name concealing rule data 7C as follows.

A character that is used very frequently in the personal name is concealed based on the personal name frequently appearing character data 7B (#201 in FIG. 10). The personal name frequently appearing character data 7B indicates information about characters that are used frequently in general in personal names and positions thereof. For example, characters shown in FIG. 11 are often used as the last character of first names in Japan, so the personal name frequently appearing character data 7B indicating such information is prepared in advance in the case where the name is written in Japanese. If the name indicated in each record related to a person includes a predetermined character in a predetermined position as shown in the personal name frequently appearing character data 7B, the concealed data generation process portion 203 conceals the character by replacing it with "*".

The M1-th character of a name indicated in a record related to a person is compared with that indicated in the other records related to persons (#203). As a result, if it is checked that a certain character is found only in one record (Yes in #204), the record can be specified only by the M1-th character. Therefore, the character is left without being concealed, and the remaining characters that have not yet been compared are all replaced with "*" to be concealed (#205). Thus, the concealing process of the name of the record is finished (#206).

If there are remaining records having a name for which the concealing process has not yet been finished (Yes in #207), the M2-th character is compared between the remaining records (#203). As a result, if it is checked that a certain character is found only in one record (Yes in #204), a person whom the record designates can be specified only by the M2-th character and the character that was compared before (i.e., the M1-th character in this case). Therefore, the M1-th and the M2-th characters are left without being concealed, and the remaining characters that have not yet been compared are all replaced with "*" to be concealed (#205). Thus, the concealing process of the name of the record is finished (#206).

Hereinafter, in the same manner, the process is repeated until there is no remaining record having a name for which the concealing process has not yet been finished. More specifically, the Mx-th character is compared between the remaining records (#203). If it is checked that a certain character is found only in one record (Yes in #204), the Mx-th character and characters before it in the record are left without being concealed, and the remaining characters that have not yet been compared are all replaced with "*" to be concealed (#205).

Note that what order of characters, from the first one, M1-th, M2-th, or . . . indicates can be defined freely in advance. For example, it may be possible that (M1, M2, M3, M4, M5 and so on) correspond to (1, 2, 3, 4, 5 and so on). Alternatively, it may be possible that (M1, M2, M3, M4, M5 and so on) correspond to (2, 1, 4, 3, 5 and so on).

If the number of records stored in the address book table TLA is large, there is high probability that the records having similar names or the same name appear. Then, the method shown in FIG. 10 may not be able to conceal even one character. Therefore, the concealing process of names may be performed by the method shown in FIG. 12 instead of the method shown in FIG. 10.

More specifically, characters of a family name in the name are all left (#211 in FIG. 12) while characters of a first name are all concealed in each record (#212). Alternatively, only the first character of a first name may be left without being concealed if the name is written in alphabet. In addition, if the records having the same expression with characters partially concealed are found (Yes in #213), a serial number such as "−1" or "−2" may be assigned to each name of the records as a suffix so that the records can be distinguished from each other (#214).

With reference to FIG. 8 again, the concealed data generation process portion 203 performs a process for concealing a part of a name of a record related to a company, a store or the like among records in the copy of the address book table TLA in accordance with the company name etc concealing rule data 7D before, after or concurrently with the process of the step #104 (#105). The company name etc concealing rule data 7D indicates a rule for realizing the process shown in FIG. 13, for example. In other words, the concealed data generation process portion 203 performs the process of concealing a part of a name of a company, a store or the like in accordance with the company name etc concealing rule data 7D as follows.

Characters such as "Inc." that are used very frequently in company names or store names as shown in the company name etc frequently appearing character data 7A (see FIG. 9) are excluded from objects of the concealing process (#301 in FIG. 13). The process of step #302 and the subsequent steps is basically the same as the concealing process of a personal name as can be understood from the comparison between FIG. 10 and FIG. 13. Therefore, the N1-th character is compared between names indicated in the individual records (#303). As a result, if it is checked that a certain character is found only in one record (Yes in #304), the record can be specified only by the N1-th character. Therefore, the character is left without being concealed, and the remaining characters that have not yet been compared are all replaced with "*" to be concealed (#305). However, the character that was excluded in the step #301 is not concealed. Thus, the concealing process of the name of the record is finished (#306).

If there are remaining records having a name for which the concealing process has not yet been finished (Yes in #307), the N2-th character is compared between the remaining records (#303). As a result, if it is checked that a certain character is found only in one record (Yes in #304), the record can be specified by the characters that were compared before the N2-th character. Therefore, the N1-th and N2-th characters are left without being concealed, and the remaining characters that have not yet been compared are all replaced with "*" to be concealed (#305). Of course, however, the character that was excluded in the step #301 is not concealed here either. Thus, the concealing process of the name of the record is finished (#306).

Hereinafter, in the same manner, the process is repeated until there is no remaining record having a name for which the concealing process has not yet been finished. More specifically, the Nx-th character is compared between the remaining records (#303). If it is checked that a certain character is found only in one record (Yes in #304), the Nx-th character and characters before it in the record are left without being concealed, and the remaining characters that have not yet been compared except the character excluded in the step #301 are all replaced with "*" to be concealed (#305). Note that what order of characters, from the first one, N1-th, N2-th or . . . indicates can be defined freely in advance.

With reference to FIG. 8 again, the concealed data generation process portion 203 performs the process of concealing a telephone number and an electronic mail address indicated in each record in the copy of the address book table TLA in accordance with the telephone number etc concealing rule data 7E (#106). The telephone number etc concealing rule data 7E indicates information about which parts of a telephone number and an electronic mail address should be concealed. For example, it indicates that the last four digits of a telephone number and a mail account part (a part on the left side of the mark "@") of an electronic mail address should be concealed. The concealed data generation process portion 203 conceals the telephone number and the electronic mail address in accordance with the information.

According to the process described above, the concealed address book table TLB as shown in FIG. 7 is generated from the copy of the address book table TLA as shown in FIG. 6, for example.

The current position information obtaining portion 103 performs a process for determining the current position of the mobile phone terminal 1. The current position can be determined by a GPS function that is already realized. More specifically, the current position information obtaining portion 103 inquires of a mobile phone company (carrier) about position information of the mobile phone terminal 1 itself so as to obtain the current position information. Alternatively, if the mobile phone terminal 1 is a so-called dual terminal as described in the following public document 1, the current position information obtaining portion 103 can determine that the current position is inside the company place if the mobile phone terminal 1 works as an extension telephone while it can determine that the current position is outside the company place if the mobile phone terminal 1 works as an mobile phone terminal.

[Public Document 1]
"http://telecom.fujitsu.com/jp/products/concept/07.html",
Fujitsu Limited, "FOMA Dual Terminal Cooperative Model", Jan. 4, 2006, searched on the Internet The address book display process portion 104 performs a process for displaying contents of the address book on the liquid crystal panel 10d in accordance with a display mode. In the present embodiment, there are prepared two display modes that are a real name display mode and an anonymous display mode. The address book display process portion 104 displays contents of the address book without concealing them like the address book screen HG1 shown in FIG. 14A in the same manner as the conventional method in the case of the real name display mode. The address book screen HG1 displays a screen of the address book based on the address book table TLA. On the other hand, it displays contents of the address book with data of the address book partially concealed like the anonymous address book screen HG2 shown in FIG. 14B in the case of the anonymous display mode. The anonymous address book screen HG2 is displayed based on the concealed address book table TLB. Switching between the display modes is performed by the procedure shown in FIG. 15, for example.

The address book display process portion 104 receives a request for changing the display mode from the user (#401 in FIG. 15). If a request for the change to the real name display mode is received (Yes in #402), the address book display process portion 104 is connected to a center of the carrier of the mobile phone terminal 1 and delivers a message instructing the user to enter a password and the like (#403). Then, the address book display process portion 104 transmits the entered password to the center and requests the same to perform user authentication (#404). Here, the center compares a preset password with the password received from the mobile phone terminal 1 so as to determine whether or not the user who is operating the mobile phone terminal 1 is a normal user. If it is determined that the user is a normal user, authentication is issued.

When the address book display process portion 104 receives the authentication from the center (Yes in #405), it changes the display mode to the real name display mode (#406). Then, if the user designates an identification code, the address book display process portion 104 reads out a record corresponding to the identification code from the address book table TLA so as to display the address book screen HG1 as shown in FIG. 14A. Note that the process of the user authentication may be performed by the mobile phone terminal 1 itself in some cases depending on the model or the carrier.

After the change to the real name display mode, a timer operation is started (#407) so as to wait for a predetermined time to pass. When the predetermined time has passed (Yes in #408), the address book display process portion 104 changes the display mode to the anonymous display mode again (#409). If the user designates an identification code in the anonymous display mode, the address book display process portion 104 reads out a record corresponding to the identification code from the concealed address book table TLB so as to display the anonymous address book screen HG2 as shown in FIG. 14B.

If the center does not issue the authentication (No in #405), the display mode is not changed to the real name display mode but the anonymous display mode remains.

On the other hand, if a request for changing to the anonymous display mode is received (No in #402), the address book display process portion 104 changes the display mode to the anonymous display mode promptly without performing a process such as the authentication (#409).

Alternatively, it is possible to change the display mode automatically responding to the current position of the mobile phone terminal 1 by the procedure shown in FIG. 16. More specifically, when a predetermined event such as a predetermined lapse of time or a predetermined operation by the user occurs (Yes in #411 of FIG. 16), the address book display process portion 104 makes the current position information obtaining portion 103 check the current position of the mobile phone terminal 1 itself (#412).

Then, if the current position is inside a predetermined area (e.g., in a company place or at user's home) (Yes in #413), the current display mode is changed to the real name display mode if it is the anonymous display mode (#414). On the other hand, if the current position is outside a predetermined area (e.g., outside a company place or outside user's home) (No in #413), the current display mode is changed to the anonymous display mode if it is the real name display mode (#415).

Figure 17:
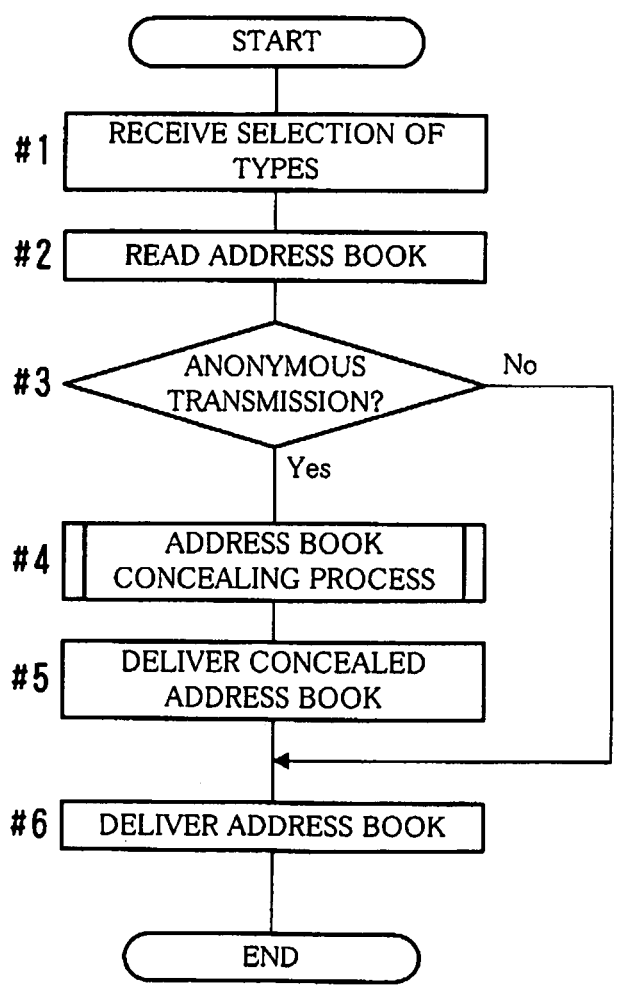
FIG. 17 is a flowchart for explaining an example of a flow of the entire process of the anonymous address book transfer device.

FIG. 17 is a flowchart for explaining an example of a flow of the entire process of the anonymous address book transfer device 2, FIG. 18 is a diagram showing an example of the address book table TLA written in English, and FIG. 19 is a diagram showing an example of the concealed address book table TLB written in English.

Next, a process flow of the anonymous address book transfer device 2 when the address book is transferred from a certain mobile phone terminal 1 to another mobile phone terminal 1 will be described with reference to the flowchart shown in FIG. 17.

The anonymous address book transfer device 2 receives in advance a selection of a model of a mobile phone terminal 1 from which the address book is transferred and a model of a mobile phone terminal 1 to which the address book is transferred (#1 in FIG. 17).

The mobile phone terminal 1 from which the address book is transferred is connected to the anonymous address book transfer device 2, so that the data of the address book table TLA to be transferred is read from the mobile phone terminal 1 (#2). On this occasion, if a format of the address book that is handled in the model of the mobile phone terminal 1 from which the address book is transferred is different from a format corresponding to the anonymous address book transfer device 2, the read address book table TLA is converted into one having a format corresponding to the latter.

If the user wants to make the address book table TLA anonymous before transfer (Yes in #3), a process for generating the concealed address book table TLB in which the address book table TLA is made anonymous (concealed) (#4). The procedure of this process is described above with reference to FIG. 8 and the like.

If a personal name is made anonymous by the method described above with reference to FIG. 10, the concealed address book table TLB as shown in FIG. 7 is generated based on the address book table TLA shown in FIG. 6, for example. Alternatively, if it is made anonymous by the method described above with reference to FIG. 12, the concealed address book table TLB as shown in FIG. 19 is generated based on the address book table TLA as shown in FIG. 18, for example.

Then, individual data of the original address book table TLA and the generated concealed address book table TLB are delivered to the mobile phone terminal 1 to which the address book is transferred (#5 and #6). On this occasion, the address book table TLA and the concealed address book table TLB are converted in advance in accordance with a format of the address book that is handled in a model of the mobile phone terminal 1 to which the address book is transferred, if necessary.

On the other hand, if the user does not want to make the address book table anonymous before transferring it (No in #3), only the data of the address book table TLA is delivered to the mobile phone terminal 1 to which the address book is transferred in the same manner as the conventional method (#6).

According to the present embodiment, contents of the address book that is used in the mobile phone terminal 1 are displayed with some contents concealed in accordance with a situation. Therefore, security of the address book can be improved more than the case of the conventional method. In addition, the carrier of the mobile phone terminal can deliver the service by the anonymous address book transfer device 2 so as to differentiate their service from that of other carriers for promoting sign-ups to their carrier from other carriers. In other words, they can enclose users of other carriers.

Although the address book indicating, as the information of other parties of communication, names, telephone numbers and electronic mail addresses is handled in the embodiment described above, the present invention can be applied to the case where an address book indicating other items is handled. For example, if the address book includes information about addresses, dates of birth, memos, facial portraits and the like, a part or the whole of the information may be concealed when it is displayed for the user.

The mobile phone terminal 1 may also display information about transmission logs, reception logs, user profiles and the like with a part or the whole of the information concealed in the anonymous display mode.

The present invention can be applied to a portable terminal device other than the mobile phone terminal. For example, the present invention can be applied to a laptop personal computer, a personal digital assistant (PDA) or the like.

The function of the concealed data generation process portion 203 shown in FIG. 5 may be provided in the mobile phone terminal 1. Then, the mobile phone terminal 1 itself may be able to generate the concealed address book table TLB.

Figure 20:
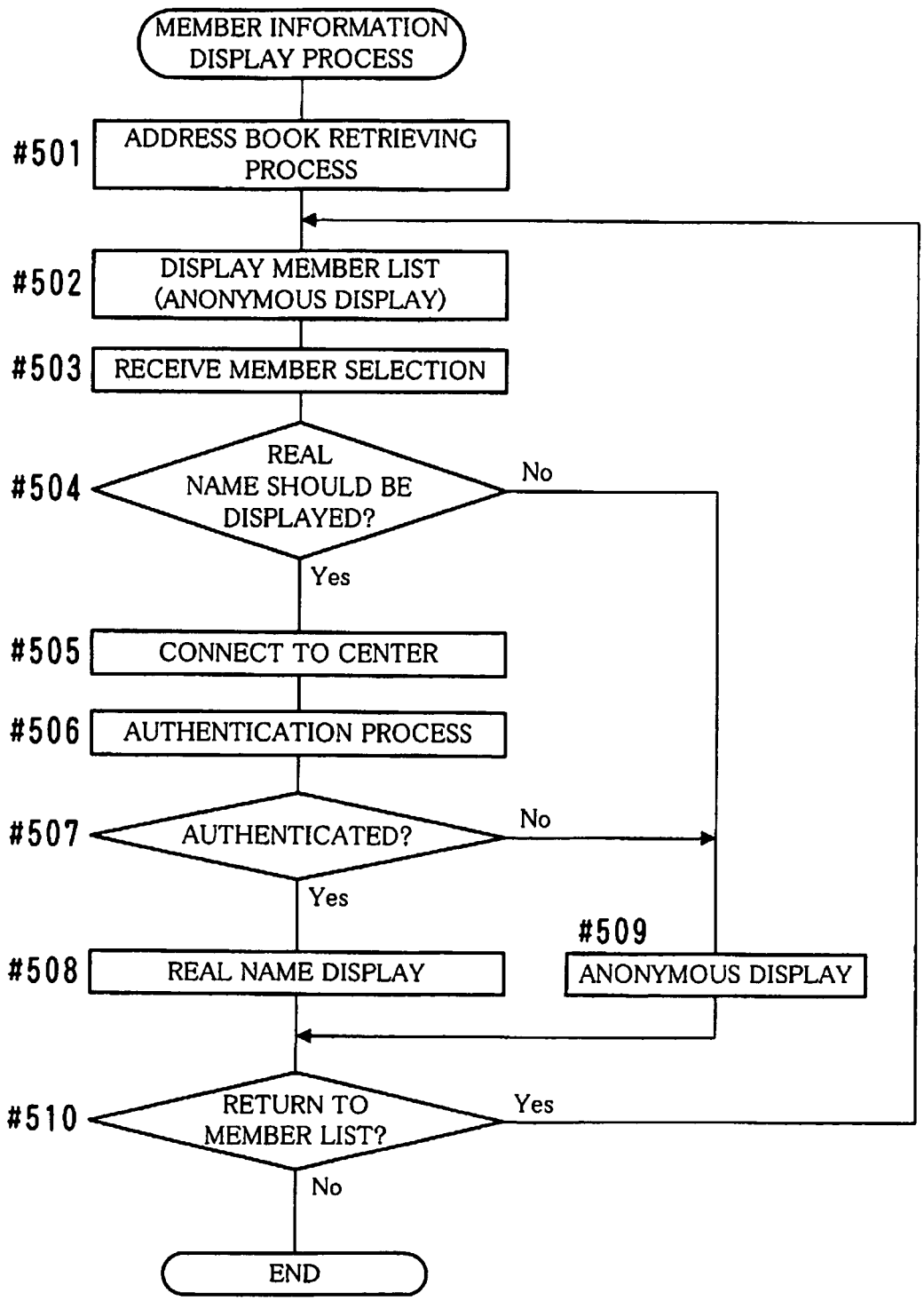
FIG. 20 is a flowchart for explaining an example of a flow of a member information display process.

FIG. 20 is a flowchart for explaining an example of a flow of a member information display process, and FIGS. 21A and 21B are diagrams showing examples of list screens HG3 and HG4.

The mobile phone terminal 1 may perform the process shown in FIG. 20 for displaying information of other parties of communication in the anonymous display mode. The mobile phone terminal 1 retrieves the concealed address book table TLB in the case of the anonymous display mode (#501) and displays the list screen HG3 shown in FIG. 21A as a screen showing a list of other parties of communication (#502). Note that the list screen HG4 shown in FIG. 21B is displayed in the case of the real name display mode.

When the user selects the identification code of any one of members (other parties of communication) on the list screen HG3 (#503), the user is asked whether a display of real names (i.e., a whole display of information) is necessary or not. If the user indicates that it is necessary by pressing a predetermined button or the like (Yes in #504), the mobile phone terminal 1 is connected to the center while the user is requested to enter a password or the like for the user authentication process (#505 and #506). Then, if the authentication is obtained (Yes in #507), information corresponding to the selected identification code is displayed without being concealed as shown in FIG. 14A (#508).

If the user indicates that the display of real names is not necessary or if the authentication is not obtained (No in #504), the information corresponding to the selected identification code is displayed with a part of the information concealed based on the concealed address book table TLB (see FIG. 7) as shown in FIG. 14B (#508).

Note that it is possible to adopt another structure in this example in which a plurality of display modes are set while a plurality of concealing levels are prepared corresponding to the display modes without limiting the display modes to the first mode and the second mode.

Other than that, the structure, the process contents, the process order of the entire or each portion of the mobile phone terminal 1 or the anonymous address book transfer device 2, the structure of the database and the like can be modified if necessary in accordance with the spirit of the present invention.

The examples described above also disclose the inventions as described below.

(Addition 1)

A portable terminal device comprising:
an address book storing portion that stores an address book indicating names and telephone numbers or electronic mail addresses of other parties of communication;
a concealed address book storing portion that stores a concealed address book in which a part or a whole of characters of the names and the telephone numbers or the electronic mail addresses of the other parties of communication is concealed; and
a display portion that displays, in a first display mode, a name and a telephone number or an electronic mail address of other party of communication designated by a user based on the address book without concealing characters of the name and the telephone number or the electronic mail address of the other party of communication designated by the user, and that displays, in a second display mode, the name and the telephone number or the electronic mail address of the other party of communication designated by the user in which a part or a whole of characters of the name and the telephone number or the electronic mail address of the other party of communication designated by the user is concealed based on the concealed address book.

(Addition 2)

A method for displaying information in a portable terminal device, the method comprising the steps of:
making an address book storing portion store an address book indicating names and telephone numbers or electronic mail addresses of other parties of communication;
making a concealed address book storing portion store a concealed address book in which a part or a whole of characters of the names and the telephone numbers or the electronic mail addresses of the other parties of communication is concealed; and
displaying, in a first display mode, a name and a telephone number or an electronic mail address of other party of communication designated by a user based on the address book without concealing characters of the name and the telephone number or the electronic mail address of the other party of communication designated by the user, while displaying, in a second display mode, the name and the telephone number or the electronic mail address of the other party of communication designated by the user in which a part or a whole of characters of the name and the telephone number or the electronic mail address of the other party of communication designated by the user is concealed based on the concealed address book.

Industrial Applicability

The present invention can be used preferably for improving security of a portable terminal device such as a mobile phone terminal.

The invention claimed is:

1. A portable terminal device comprising:
an address book storing portion that stores an address book indicating names and telephone numbers or electronic mail addresses of other parties of communication;
a concealed character string generating portion that generates a concealed character string in which a part or a whole of characters of the names and the telephone numbers or the electronic mail addresses of the other parties of communication is concealed, said concealed character string is generated by concealing a first character or a second character among characters of the names and the telephone numbers or the electronic mail addresses, said first character being a character other than a character frequently used and the second character being a character found as one of a predetermined character of the names and the telephone numbers or the electronic mail addresses and found as a predetermined character of any other names and telephone numbers or electronic mail addresses; and a display portion that displays, in a first display mode, a name and a telephone number or an electronic mail address of other party of communication designated by a user based on the address book without concealing characters of the name and the telephone number or the electronic mail address of the other party of communication designated by the user, and that displays, in a second display mode, the name and the telephone number or the electronic mail address of the other party of communication designated by the user as the concealed character string generated by the concealed character string generating portion.

2. The portable terminal device according to claim 1, further comprising a current position information obtaining portion that obtains information about a current position of the portable terminal device, the first display mode being set if the current position of the portable terminal device is within a predetermined area while the second display mode being set if the current position of the portable terminal device is outside the predetermined area.

3. The portable terminal device according to claim 1, wherein if a password entered by the user is correct, the first display mode is set until a predetermined event occurs and the second display mode is set after the predetermined event has occurred.

4. The portable terminal device according to claim 1, further comprising an address book input portion that enters the address book from another device and a concealed address book storing portion that stores a concealed address book indicating the concealed character string generated by the concealed character string generating portion, the concealed character string generating portion generating the concealed character string by concealing a part of characters indicated in the address book entered by the address book input portion.

5. An address book transfer device for transferring an address book stored in a first portable terminal device to a second portable terminal device, the address book transfer device comprising:

an address book input portion that enters the address book from the first portable terminal device;

a concealed address book generating portion that generates a concealed address book by concealing a part of characters indicated in the entered address book, said concealed address book includes a concealed character string concealing a first character or a second character among characters of names and telephone numbers or electronic mail addresses, said first character being a character other than a character frequently used and the second character being a character found as one of a predetermined character of the names and the telephone numbers or the electronic mail addresses and found as a predetermined character of any other names and telephone numbers or electronic mail addresses; and an address book output portion that delivers the generated concealed address book and an address book from which the concealed address book is generated to the second portable terminal device.

6. A method for displaying information in a portable terminal device, the method comprising:

making an address book storing portion store an address book indicating names and telephone numbers or electronic mail addresses of other parties of communication;

generating a character string in which a part or a whole of characters of the names and the telephone numbers or the electronic mail addresses of the other parties of communication is concealed, said concealed character string is generated by concealing a first character or a second character among characters of the names and the telephone numbers or the electronic mail addresses and said first character being a character other than a character frequently used and the second character being a character found as one of a predetermined character of the names and the telephone numbers or the electronic mail addresses and found as a predetermined character of any other names and telephone numbers or electronic mail addresses; and displaying, in a first display mode, a name and a telephone number or an electronic mail address of other party of communication designated by a user based on the address book without concealing characters of the name and the telephone number or the electronic mail address of the other party of communication designated by the user, and displaying, in a second display mode, the generated character string in which a part or a whole of characters of the name and the telephone number or the electronic mail address of the other party of communication designated by the user.

7. The method for displaying information according to claim 6, further comprising obtaining information about a current position of the portable terminal device, setting the first display mode if the current position of the portable terminal device is within a predetermined area, and setting the second display mode if the current position of the portable terminal device is outside the predetermined area.

8. An address book transfer method for transferring an address book stored in a first portable terminal device to a second portable terminal device, the address book transfer method comprising:

entering the address book from the first portable terminal device;

generating a concealed address book by concealing a part of characters indicated in the entered address book, said concealed address book includes a concealed character string generated by concealing a first character or a second character among characters of a name and a telephone number or an electronic mail address and said first character being a character other than a character frequently used and the second character being a character found as one of a predetermined character of the names and the telephone numbers or the electronic mail addresses and found as a predetermined character of any other names and telephone numbers or electronic mail addresses; and delivering the generated concealed address book and an address book from which the concealed address book is generated to the second portable terminal device.

9. A tangible computer-readable medium having a computer program for use in a portable terminal device, the computer program making the portable terminal device perform the process comprising:

making an address book storing portion store an address book indicating names and telephone numbers or electronic mail addresses of other parties of communication;

generating a character string in which a part or a whole of characters of the names and the telephone numbers or the electronic mail addresses of the other parties of communication is concealed, said concealed character string is generated by concealing a first character or a second character among characters of the names and the telephone numbers or the electronic mail addresses and said first character being a character other than a character frequently used and the second character being a character found as one of a predetermined character of the names and the telephone numbers or the electronic mail addresses and found as a predetermined character of any other names and telephone numbers or electronic mail addresses; and displaying, in a first display mode, a name and a telephone number or an electronic mail address of other party of communication designated by a user based on the address book without concealing characters of the name and the telephone number or the electronic mail address of the other party of communication designated by the user, and displaying, in a second display mode, the generated character string in which a part or a whole of characters of the name and the telephone number or the electronic mail address of the other party of communication designated by the user.

10. A non-transitory computer-readable medium having a computer program for use in a computer transferring an address book stored in a first portable terminal device to a second portable terminal device, the computer program making the computer execute the process comprising:

entering the address book from the first portable terminal device;

generating a concealed address book by concealing a part of characters indicated in the entered address book, said concealed address book includes a concealed character string generated by concealing a first character or a second character among characters of a name and a telephone number or an electronic mail address and said first character being a character other than a character frequently used and the second character being a character found as one of a predetermined character of the names and the telephone numbers or the electronic mail addresses and found as a predetermined character of any other names and telephone numbers or electronic mail addresses; and delivering the generated concealed address book and an address book from which the concealed address book is generated to the second portable terminal device.

11. The portable terminal device according to claim 2, further comprising an address book input portion that enters the address book from another device and a concealed address book storing portion that stores a concealed address book indicating the concealed character string generated by the concealed character string generating portion, the concealed character string generating portion generating the concealed character string by concealing a part of characters indicated in the address book entered by the address book input portion.

12. The portable terminal device according to claim 3, further comprising an address book input portion that enters the address book from another device and a concealed address book storing portion that stores a concealed address book indicating the concealed character string generated by the concealed character string generating portion, the concealed character string generating portion generating the concealed character string by concealing a part of characters indicated in the address book entered by the address book input portion.

13. The portable terminal device according to claim 1, wherein generating the concealed character string is implemented by replacing a part of record data having an identification code as record data stored in the address book with a predetermined character.

14. The address book transfer device according to claim 5, wherein generating the concealed character string is implemented by replacing a part of record data having an identification code as record data stored in the address book with a predetermined character.

* * * * *

UNITED STATES PATENT AND TRADEMARK OFFICE
CERTIFICATE OF CORRECTION

PATENT NO. : 8,478,255 B2
APPLICATION NO. : 12/216804
DATED : July 2, 2013
INVENTOR(S) : Takashi Ikemori et al.

Page 1 of 1

It is certified that error appears in the above-identified patent and that said Letters Patent is hereby corrected as shown below:

On the Title Page Col. 2 (Other Publications), insert -- Japanese Office Action issued June 22, 2010 in corresponding Japanese Patent Application 2007-553790 --.

Signed and Sealed this
Fifteenth Day of October, 2013

Teresa Stanek Rea
*Deputy Director of the United States Patent and Trademark Office*